April 25, 1933.  H. A. WADMAN  1,905,533
FOREHEARTH OF GLASS MELTING FURNACES
Filed March 1, 1930  2 Sheets-Sheet 1
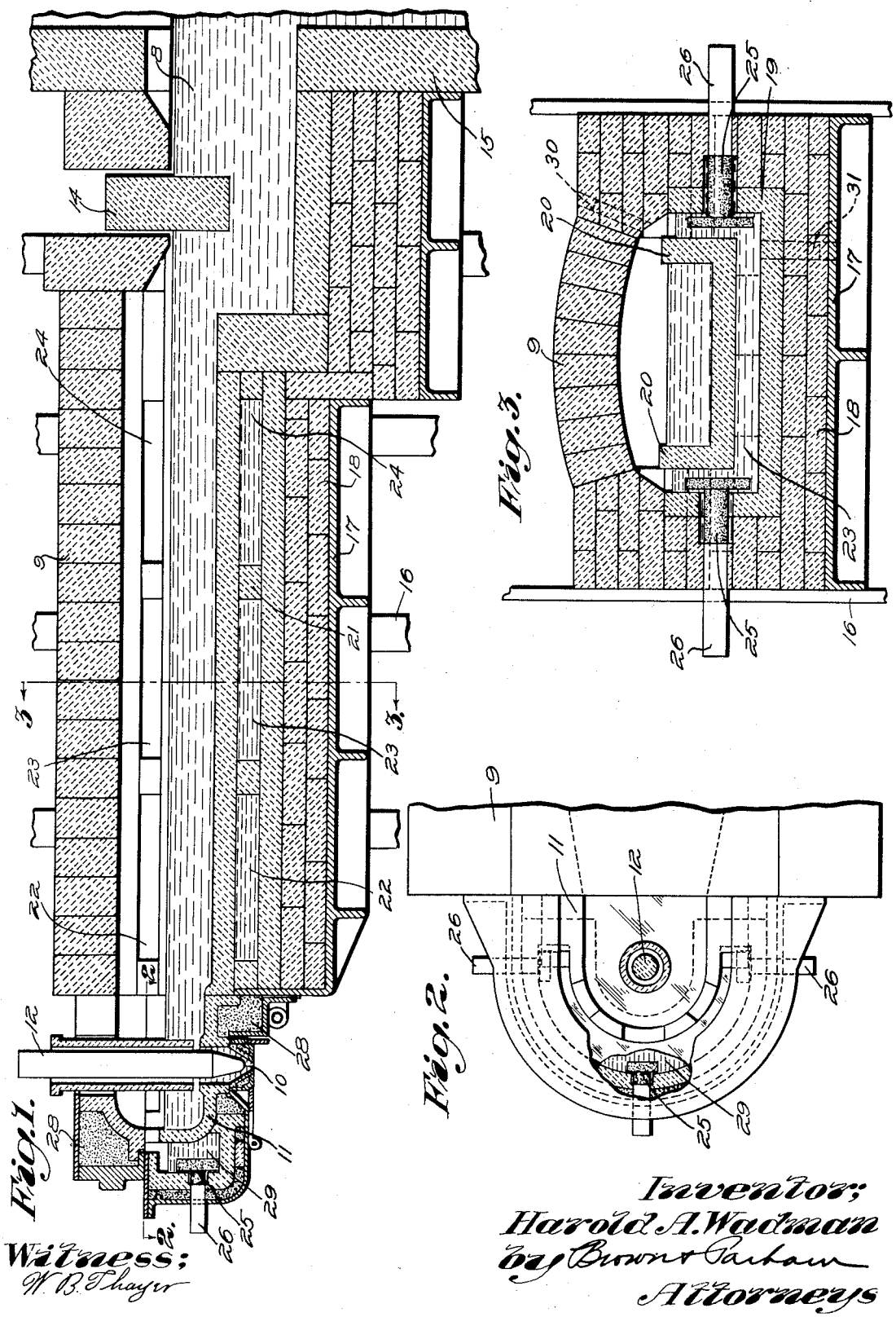
Inventor:
Harold A. Wadman
by Brown+Carlaw
Attorneys
Witness:
W. B. Thayer

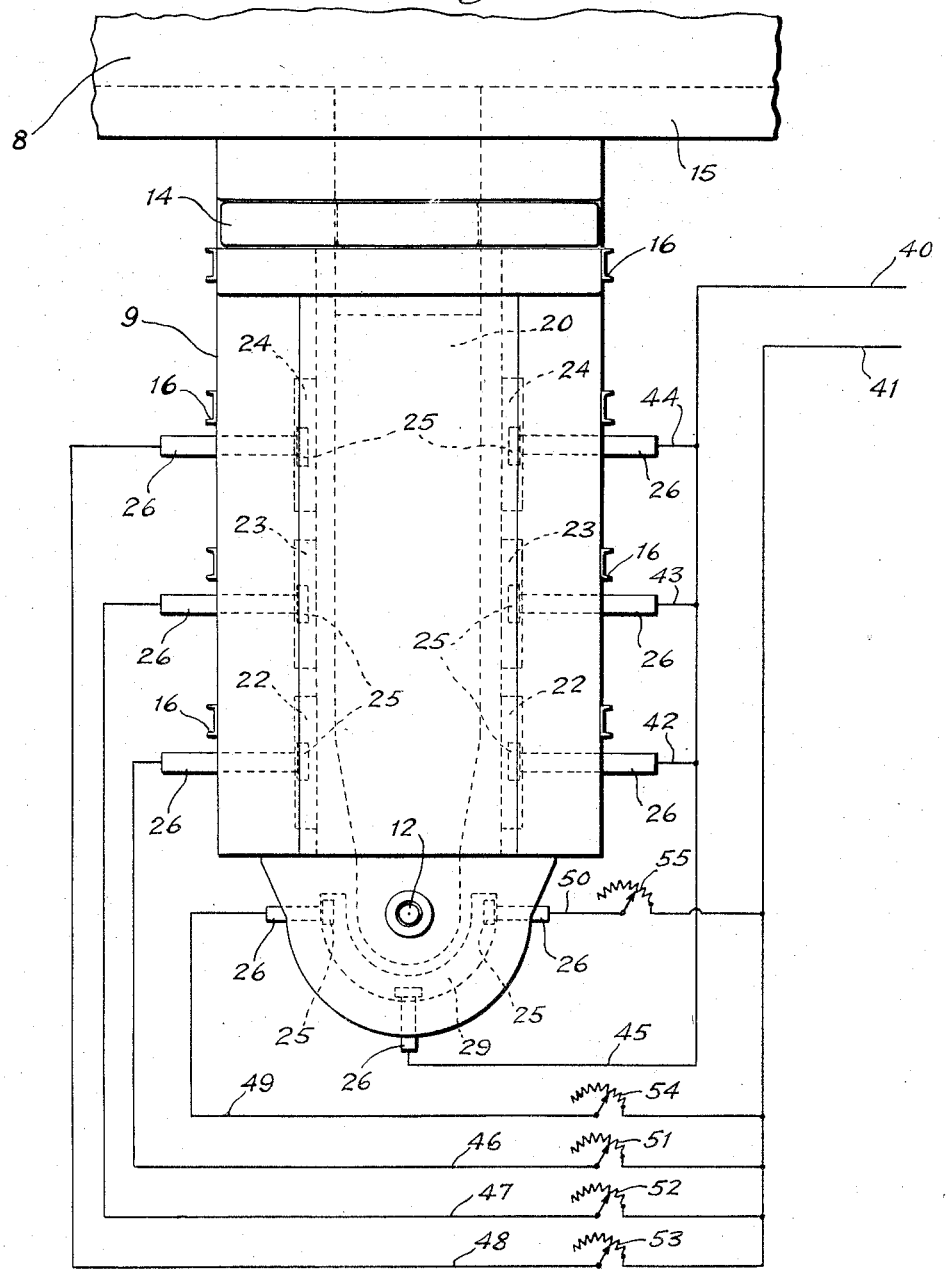

Patented Apr. 25, 1933

1,905,533

UNITED STATES PATENT OFFICE

HAROLD A. WADMAN, OF HARTFORD, CONNECTICUT, ASSIGNOR TO HARTFORD-EMPIRE COMPANY, OF HARTFORD, CONNECTICUT, A CORPORATION OF DELAWARE

FOREHEARTH OF GLASS MELTING FURNACES

Application filed March 1, 1930. Serial No. 432,370.

My invention relates to forehearths of glass melting furnaces wherein the desired temperature is maintained electrically, and more particularly to such forehearths in which molten glass serves as a resistance to the flow of electric current.

Heretofore it has been proposed to heat glass by the application of electric energy in one of two ways: (1) By the use of electrodes immersed in the bath of glass which is being conditioned. Serious problems present themselves in the practice of this method due to the tendency of the electrodes to disintegrate and to discolor the glass. (2) It has also been proposed to create a heated atmosphere above and/or below a bath of glass to be conditioned by employing resistors of metallic compositions which are entirely out of contact with the glass to be melted. Such a practice has not been successful, primarily because of the very high temperatures required, and because the resistances heretofore proposed have been unable to withstand such necessary high temperatures.

By my present invention, I propose to avoid the difficulties of these two prior methods by supplying, as the electric resistance, a bath of glass distinct from the glass which is to be used in the manufacture of glassware, and to apply the heat developed in this resistance to the glass which ultimately forms the ware, by conduction, radiation and convection. Thus, if contamination occurs in the glass used as the resistance, it in no way harms the ware. The glass of the resistance will readily withstand extremely high temperatures, the only limits being those imposed by the refractory material in which the resistance bath is contained.

As has heretofore usually been the practice, a forehearth, when separately heated, has been heated by combustion applied over the surface of the glass bath, and there has frequently been a tendency in the glass in these forehearths due to uneven transverse heating to flow more rapidly in a central channel than adjacent the sides and bottom of the forehearth. Various means have been heretofore proposed to correct this tendency, such for example, as the application of special means to provide a center cooling by radiation, as in Peiler United States Patent No. 1,656,869, granted January 17, 1928.

My arrangement of heating means is usually well adapted to correct, in the forehearth, variations in the heat condition of the glass delivered thereto from the tank. Frequently, the conditions in the tank vary sufficiently that the glass delivered under the skimmer and sealing block and to the forehearth is at different times in different thermal conditions. As is well known, it is desirable that the glass delivered from the feeder be maintained constantly at a uniform temperature and condition. The best feeder practice requires that correction of changes in the heat condition of the glass entering the forehearth be made as close to the furnace as possible. At the forward portions of the forehearth, the effort is usually directed to maintaining the desired condition which has been obtained in the regulation in the rear portion thereof. My invention is obviously peculiarly adapted to this preferred practice.

An object of my invention is to provide means for conditioning glass by the use of a second body of glass, which is used as a resistance to an electric current.

Another object is to provide a novel glass feeder forehearth provided with a plurality of independently controllable electric heating means, including a resistance of glass other than that which is to form the glassware.

Yet another object is to provide a means for obtaining a uniform flow of glass through a forehearth.

A further object is to provide a new and improved method of regulating the temperature of glass in a forehearth.

Further objects of my invention will be apparent from the following specification and claims.

In the drawings,

Figure 1 shows a forehearth of a glass melting furnace in vertical longitudinal section, embodying the preferred form of my invention;

Fig. 2 is a plan view with parts broken away and in section of the feeding chamber of the forehearth, the sectional showing being on the line 2—2 of Fig. 1;

Fig. 3 is a vertical transverse section of the forehearth taken on the line 3—3 of Fig. 1; and Fig. 4 is a plan view of the forehearth of the preceding figures showing diagrammatically a possible wiring diagram for supplying electric current to furnish heat to the glass as desired.

Referring to the drawings, wherein I have shown my invention as embodied in a glass feeder forehearth, I provide a glass melting tank 8 at the forward end of which there is a forehearth 9, from which glass may be taken by any preferred means, as, for instance, through the outlet 10 of a bowl 11 under the control of a plunger 12. Glass enters the forehearth 9 from the melting tank 8 through a suitable opening in the tank wall 15 and under the skimmer and sealing block 14. This block heat separates the melting tank 8 from the forehearth 9 and permits a separate heat control of the two.

The forehearth 9 is supported on pillars 16 and a frame 17. Extensions of the frame support the bowl 11.

The bottom and sides of the forehearth and bowl are similarly constructed of one or more outer layers of refractory brick 18, within which is a layer of glass resistant refractory material or flux block 19, which material should be of such a type as will strongly resist the thermal and chemical attacks of molten glass, as, for example, that described in Patent No. 1,605,885, to Paul G. Willetts, patented Nov. 2, 1926. The material or blocks 19 should be preferably so formed or laid that no extension points or crevices parallel to the lines of flow of electric current are present. Preferably the construction should be in accordance with the disclosure of the application of MacIntosh, Ser. No. 380,950, filed July 25, 1929.

The bowl is insulated as indicated at 28 (Fig. 1) as by a powdered or granular insulating substance. A basin or flow channel 20 is built up of material having qualities similar to those of the lining 19. The sides thereof, however, do not contact with the crown or arch of the forehearth. The bottom and sides are spaced from the bottom and sides respectively of the forehearth proper by blocks 21 preferably of similar material. These blocks 21 divide the space surrounding the flow channel 20 into a plurality of compartments 22, 23, 24, and 29. The blocks 21 preferably are of such size, shape, and composition, that they preclude the passage of glass and of electrical current between the compartments.

Through apertures in the walls of the forehearth 9 and of the bowl 11, are introduced carbon or graphite electrodes 25, such for instance as those shown in the United States application for Letters Patent of Johann K. B. Raeder, 56,301, filed Sept. 14, 1925 now Patent No. 1,820,247, issued Aug. 25, 1931, or British patent to Raeder, 262,535. Terminals 26 are connected thereto and these in turn connect with a source of supply of electrical current. As the type of current or the connections are not in themselves a part of this invention, they are not described herein, but any suitable form or type may be used either single or polyphase or a combination thereof. While any desired type of current control may be used for supplying electric energy to heat the glass in the chambers 22, 23, 24 and 29, I have shown in Fig. 4 a simple arrangement which might be used. As shown, current is supplied to the forehearth from main line wires 40 and 41 which may be connected to a source of single phase alternating current (not shown). The wire 40 is shown connected directly to one of the electrodes of each of the chambers 22, 23 and 24 by the conductors 42, 43 and 44 respectively and to the center electrode of the feeder bowl by the conductor 45. The wire 41 is shown connected to the remaining electrodes of chambers 22, 23 and 24 by conductors 46, 47 and 48 respectively, and to the two side electrodes of the feeder bowl by conductors 49 and 50. Interposed in each of the conductors 46 to 50 are current control devices shown diagrammatically as rheostats 51, 52, 53, 54 and 55 respectively.

The glass which acts as the resistor in the compartments 22, 23, 24 and 29 may be poured into the compartments and removed therefrom in any manner, as for example by the stoppered passages 30 and 31.

As glass is a good electrical conductor only when highly heated, suitable temporary arrangement must be made in starting up the operations with the forehearth of my invention. If the operation is to be started at a time when no glass is contained in the compartments 22, 23, 24 and 29, molten glass of sufficiently high temperature may be introduced directly thereinto, either by ladling or otherwise, as through the passages 30, and the electrical heat can be caused to function at once. If, however, the operation is to begin with glass which has previously been allowed to cool in the passages, this glass must be heated to a sufficient temperature either by the application of special temporary burners to the forehearth as through the openings 30 or by a temporary removing of the sealing block 14, which permits the heat from the furnace, which is also being heated, to radiate into and raise the temperature of the forehearth. As soon as the temperature of the glass in the compartments reaches approximately 1200° F., the electric heating means will begin to function. Obviously substances other than glass may be used as the resistance element if they have properties similar to those of glass.

Thereafter, if desired, the rate of heating may be increased by connecting the electrodes of the several compartments in parallel, and after the temperature has been brought to a sufficiently high point, these connections may be changed so that the electrodes of the several compartments 22, 23 and 24 are in series. Preferably, the electrical arrangements are such that the application of current between the electrodes of the several compartments may be independently regulated as by the use of the rheostats 51 to 56 inclusive or some equivalent means, and thus a desired flexible control may be had of the heat conditions in the forehearth.

In the operation of a feeder forehearth such as that shown and described herein, it has been found desirable to assure the uniform passage of the entire stream of glass from end to end of the forehearth.

My invention, when applied to such a forehearth, provides an excellent and novel means by which the desired uniform flow may be obtained and further by which a proper zone regulation of the heat condition of the glass longitudinally of the forehearth may be accomplished. As the heat is applied in my novel structure where it is most desirable that it should be applied, namely, directly to the sides and bottom, I assure a sufficient reduction of the friction between the walls of the glass containing basin 20 and the glass passing therethrough to assure a full cross-sectional flow of the glass in the container. Preferably the range of temperature of the glass is gradually and more closely limited as it approaches the feeder bowl.

If accidentally the glass arriving at the forehearth under the skimmer block 14 is too hot, the temperature in the compartment 24 may be promptly reduced through a separate electrical control to reduce the temperature of the glass in the basin to that desired, well ahead of the arrival of that glass at the discharge outlet 10, and so with the compartments 23 and 22.

An improper heat condition of the glass in the forehearth usually makes itself evident in the character of the charges being delivered through the outlet and obviously the conditioning of the glass then in the forehearth cannot be instantly corrected by the regulation of the rearward heating element, and for that reason among others, a suitable separate control is arranged for the heating element in the feeder bowl and in the forward portions of the forehearth, and it is through the regulation of these forward heating elements that the immediate correction of the heat condition is to be obtained. In other words, the forehearth provides excellent heat control means provided with separate intermediate heat regulating controls and distance controls, which assure an adequate and proper control of the temperature of the glass being fed at all times.

It is to be understood that the embodiment of the invention shown above is for the purpose of illustration only, and various modifications may be made therein without departing from the spirit and the scope of the invention, as defined in the appended claims.

I claim as my invention:

1. A forehearth for a glass melting furnace comprising a trough adapted to receive glass from the furnace, a second trough adapted to maintain a body of glass in contact with the bottom and side walls of the first trough, means comprising the first trough for dividing the second trough into a plurality of electrically insulated compartments, and means to pass a variably controllable electrical current through the glass contained in each of said compartments, whereby the temperature of the various compartments may be regulated.

2. A forehearth for a glass melting furnace comprising a glass conditioning trough in which glass is received from the furnace, a bowl attached to the forehearth in which glass is received from the forehearth and from which glass is removed, and means comprising molten glass and means for passing independently controllable electric currents therethrough to heat independently the trough and the bowl, whereby the temperatures of each may be independently regulated.

Signed at Hartford, Connecticut, this 25th day of February, 1930.

HAROLD A. WADMAN.